(12) United States Patent
Vandike et al.

(10) Patent No.: US 7,946,368 B2
(45) Date of Patent: May 24, 2011

(54) AGRICULTURAL MACHINE HAVING DEDICATED MULTI-SECTION FAN UNIT

(75) Inventors: Nathan R. Vandike, Silvis, IL (US); Alan D. Sheidler, Moline, IL (US)

(73) Assignee: Deere & Company, Moline, IL (US)

( * ) Notice: Subject to any disclaimer, the term of this patent is extended or adjusted under 35 U.S.C. 154(b) by 414 days.

(21) Appl. No.: 12/172,714

(22) Filed: Jul. 14, 2008

(65) Prior Publication Data

US 2010/0006361 A1    Jan. 14, 2010

(51) Int. Cl.
*B60K 11/00* (2006.01)
*B60K 13/02* (2006.01)

(52) U.S. Cl. .................. 180/68.1; 180/68.3; 180/68.2

(58) Field of Classification Search ............... 180/68.1, 180/68.4, 68.3, 89.1, 89.17, 68.2; 55/385.3, 55/294; 123/198 E, 41.49, 41.11, 590
See application file for complete search history.

(56) References Cited

U.S. PATENT DOCUMENTS

| | | | | |
|---|---|---|---|---|
| 2,197,203 A | * | 4/1940 | Buffington | 62/94 |
| 2,708,920 A | * | 5/1955 | Pasturczak | 123/198 E |
| 3,186,389 A | * | 6/1965 | Sylvan | 123/590 |
| 3,565,203 A | * | 2/1971 | Ashton et al. | 180/68.4 |
| 3,630,003 A | * | 12/1971 | Ashton et al. | 180/68.1 |
| 3,786,891 A | * | 1/1974 | Vogelaar et al. | 180/68.4 |
| 4,667,629 A | * | 5/1987 | Hagarty | 123/198 E |
| 5,427,502 A | * | 6/1995 | Hudson | 180/68.1 |
| 6,068,675 A | * | 5/2000 | Tsuda et al. | 55/385.3 |
| 6,202,777 B1 | * | 3/2001 | Surridge | 180/68.1 |
| 6,220,207 B1 | * | 4/2001 | Kawasaki et al. | 123/41.11 |
| 6,457,542 B1 | * | 10/2002 | Hosono et al. | 180/68.1 |
| 7,507,270 B2 | * | 3/2009 | Maas et al. | 55/385.3 |

* cited by examiner

*Primary Examiner* — Hau V Phan
(74) *Attorney, Agent, or Firm* — Taylor IP

(57) ABSTRACT

A fan unit for an agricultural machine includes a fan housing configured to define a plurality of fan chambers. Each fan chamber of the plurality of fan chambers has a respective air inlet port and a respective air outlet port. A shaft is rotatably mounted to the fan housing. The shaft has an axis of rotation that intersects the plurality of fan chambers. A plurality of fans is attached to the shaft for rotation with the shaft. Each fan of the plurality of fans is located in a separate respective fan chamber of the plurality of fan chambers.

3 Claims, 6 Drawing Sheets

AGRICULTURAL MACHINE HAVING DEDICATED MULTI-SECTION FAN UNIT

FIELD OF THE INVENTION

The present invention relates to agricultural machines, and, more particularly, to a fan unit having multiple fan sections for performing simultaneous functions in an agricultural machine.

BACKGROUND OF THE INVENTION

One type of agricultural machine is a harvesting machine, e.g., an agricultural combine. Agricultural combines are engine powered machines that harvest, thresh, separate and clean an agricultural crop. The resulting clean grain is stored in a grain tank located on the combine. The clean grain can then be transported from the grain tank to a truck, grain cart or other receiving bin by an unloading auger.

Such harvesting machines typically include a cooling package to remove heat from the coolant circulating through the engine powering the agricultural combine. The cooling package may include, for example, a housing mounting a radiator, and a rotary screen mounted on the air intake side of the radiator. Due to the presence of dust and chaff during operation of the agricultural combines, the rotary screen begins to collect the dust and chaff on the outer surface of the rotary screen. A vacuum duct is used to transfer the material, e.g., dust and chaff, off of the outer screen surface of the rotary screen during operation, with the vacuum source being provided by the engine cooling fan associated with the cooling package.

In addition, many harvesting machines also use a pre-cleaner to prevent large dust and crop material from entering the air filter system, thereby increasing air filter life. The material separated by the pre-cleaner must be removed from the pre-cleaner device. One way to remove the material separated by the pre-cleaner is to aspirate this material captured by the pre-cleaner to the exhaust stack through a venturi. However, an exhaust venturi may cause excessive back pressure in the engine exhaust system, and the pressure drop created by the exhaust venturi is heavily dependent on engine load. Another way to remove the material separated by the pre-cleaner is to aspirate by utilizing the pressure drop created by the engine cooling fan.

Such designs that utilize the pressure drop created by the engine cooling fan are dependent on engine load, and thus at times may be inconsistent in cleaning the cooling package air screen and aspirating the air cleaner pre-cleaner.

SUMMARY OF THE INVENTION

The present invention provides a dedicated multi-section fan unit for an agricultural machine. The fan unit is configured to create multiple pressure changes, e.g., pressure drops, used in performing a plurality of cleaning functions in an agricultural machine, such as for example, cleaning debris from a cooling package screen and aspirating the air cleaner pre-cleaner.

The invention, in one form thereof, is directed to a fan unit for an agricultural machine. The fan unit includes a fan housing configured to define a plurality of fan chambers. Each fan chamber of the plurality of fan chambers has a respective air inlet port and a respective air outlet port. A shaft is rotatably mounted to the fan housing. The shaft has an axis of rotation that intersects the plurality of fan chambers. A plurality of fans is attached to the shaft for rotation with the shaft. Each fan of the plurality of fans is located in a separate respective fan chamber of the plurality of fan chambers.

The invention, in another form thereof, is directed to a fan unit for an agricultural machine having an engine with a crankshaft. The fan unit has a first fan section and a second fan section. The first fan section has a first fan chamber and a first fan. The first fan is located in the first fan chamber. The second fan section has a second fan chamber and a second fan. The second fan is located in the second fan chamber. A shaft is connected to each of the first fan and the second fan for rotation in unison with the shaft. The shaft is rotatably connected to the crankshaft of the engine.

The invention, in another form thereof, is directed to an agricultural machine. The agricultural machine includes an internal combustion engine having a crankshaft. An air cleaner system includes an air cleaner and an air pre-cleaner coupled to the air cleaner. The air cleaner system is coupled in fluid communication with the internal combustion engine for supplying combustion air to the internal combustion engine. The air pre-cleaner has a first vacuum port. A cooling package is in fluid communication with the internal combustion engine. The cooling package includes a radiator having an air inlet and an air outlet, a rotary screen mounted at the air inlet of the radiator, and a vacuum duct having a vacuum opening and a second vacuum port. The vacuum opening of the vacuum duct is positioned adjacent the rotary screen. A fan unit is coupled in fluid communication with the air pre-cleaner and the cooling package. The fan unit includes a fan housing configured to define a plurality of fan chambers, each fan chamber of the plurality of fan chambers having a respective air inlet port and a respective air outlet port. A first air inlet port of a first fan chamber of the plurality of fan chambers is connected in fluid communication with the first vacuum port of the air pre-cleaner. A second air inlet port of a second fan chamber of the plurality of fan chambers is connected in fluid communication with the second vacuum port of the cooling package. A shaft is rotatably mounted to the fan housing. The shaft is rotatably coupled to the crankshaft of the internal combustion engine. A plurality of fans is attached to the shaft for rotation with the shaft, wherein a first fan of the plurality of fans is located in the first fan chamber and a second fan of the plurality of fans is located in the second fan chamber.

DETAILED DESCRIPTION OF THE INVENTION

Figure 1:
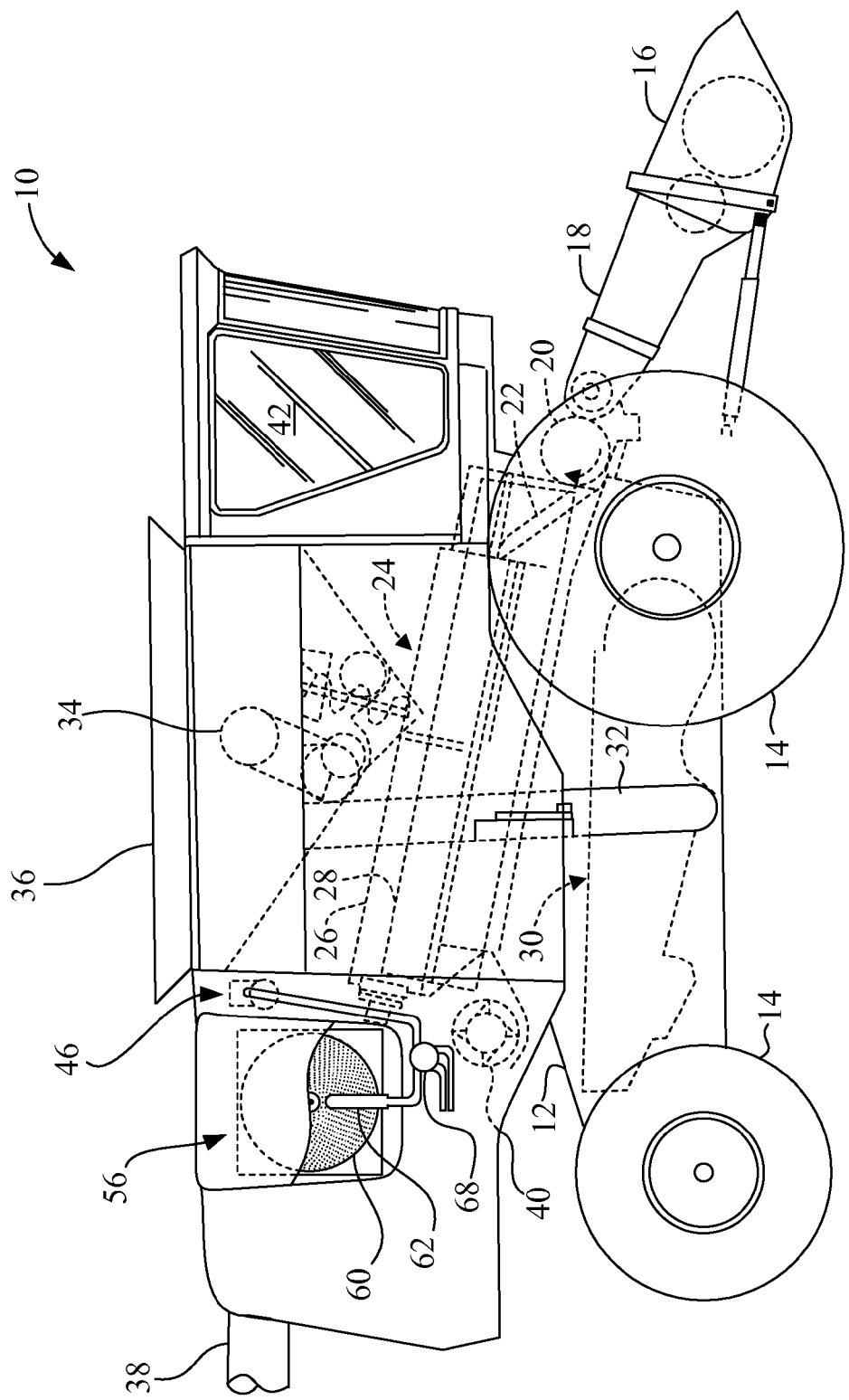
FIG. 1 is a diagrammatic side view of an agricultural machine, and in particular an agricultural combine, embodying the present invention.

FIG. 1 is a diagrammatic depiction of an agricultural machine 10. In the embodiment shown, agricultural machine 10 is in the form of an agricultural combine. Although the invention is being described as being incorporated into a combine, it is contemplated that the present invention may be used with other types of agricultural machines.

Agricultural machine 10, in the form of a combine, includes a supporting structure 12. A propulsion unit 14, which may include tires and/or tracks that engage the ground, is coupled to supporting structure 12, and performs propulsion and/or steering functions. A harvesting platform 16 is used for harvesting a crop and directing the crop to a feederhouse 18. The harvested crop is directed by feederhouse 18 to a beater 20. Beater 20 directs the harvested crop upwardly through an inlet transition section 22 to an axial crop processing unit 24.

Axial crop processing unit 24 is located between, and supported by the side sheets of agricultural machine 10. Axial crop processing unit 24 includes an axial rotor housing 26 and an axial rotor 28 located in axial rotor housing 26. The harvested crop enters axial rotor housing 26 through inlet transition section 22. Axial rotor 28 is provided with an in-feed portion, a threshing portion and a separating portion. Axial rotor housing 26 has a corresponding in-feed section, a threshing section and a separating section.

Both crop processing portions, the threshing portion and the separating portion, are provided with crop engaging assemblies. The threshing section of the axial rotor housing 26 is provided with a concave and the separating section is provided with a grate. Grain and chaff released from the crop mat falls through the concave and the grate. The concave and grate prevent the passage of crop material larger than grain or chaff from entering a cleaning system 30.

Grain and chaff falling through the concave and grate is directed to cleaning system 30 which removes the chaff from the grain. The clean grain is then directed by a clean grain elevator 32 to a fountain auger 34. Fountain auger 34 directs the grain into a grain tank, or grain compartment, 36. The grain is removed from the grain tank 36 by an unloading auger 38.

As the crop residue, e.g., straw, stalks, chaff, dust, etc., reaches the end of the crop processing unit it is expelled through an outlet to a beater 40. Beater 40 propels the crop residue out the rear of the combine. The operation of agricultural machine 10 is controlled from the operator's cab 42.

Figure 2:
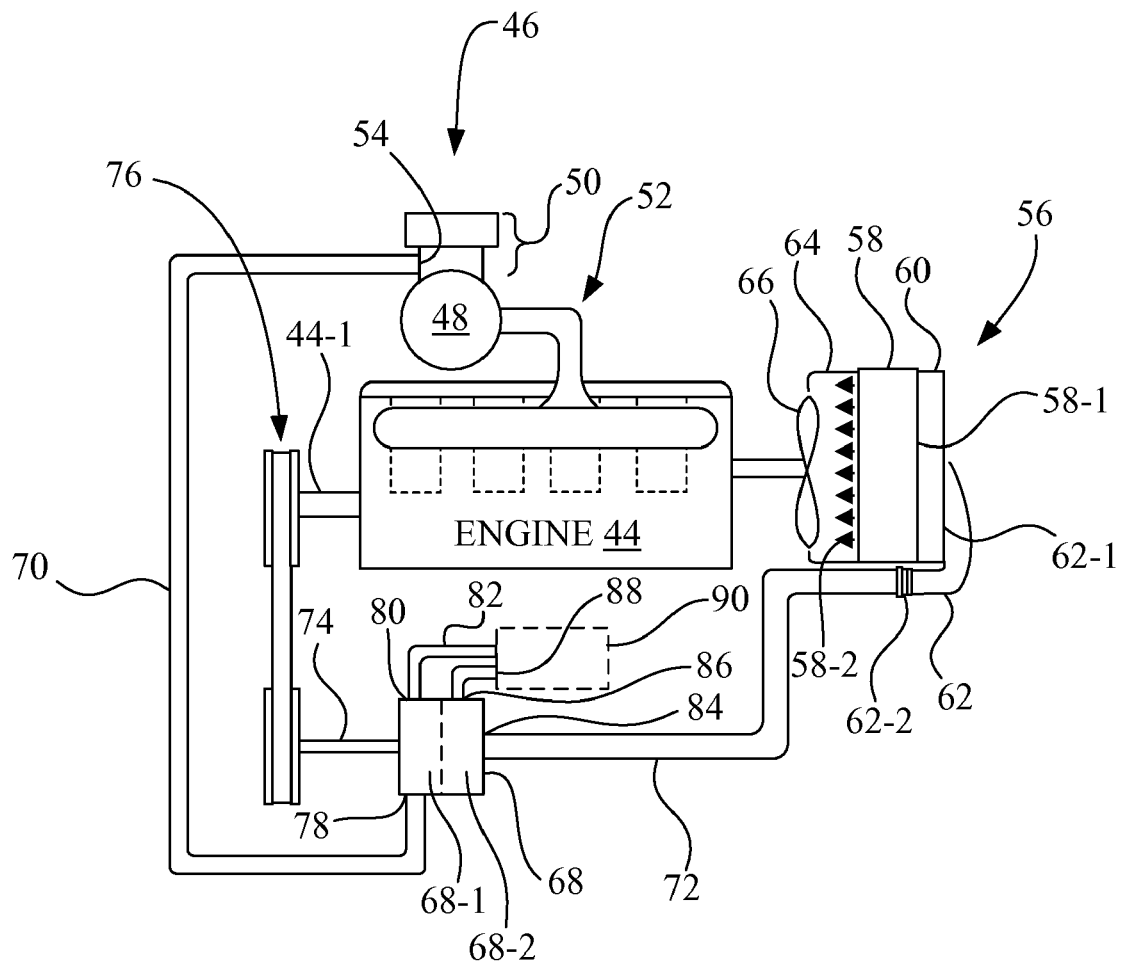
FIG. 2 is a schematic diagram of an air cleaner system, a cooling package, and a fan unit of FIG. 1, configured in accordance with an embodiment of the present invention.
Figure 3:
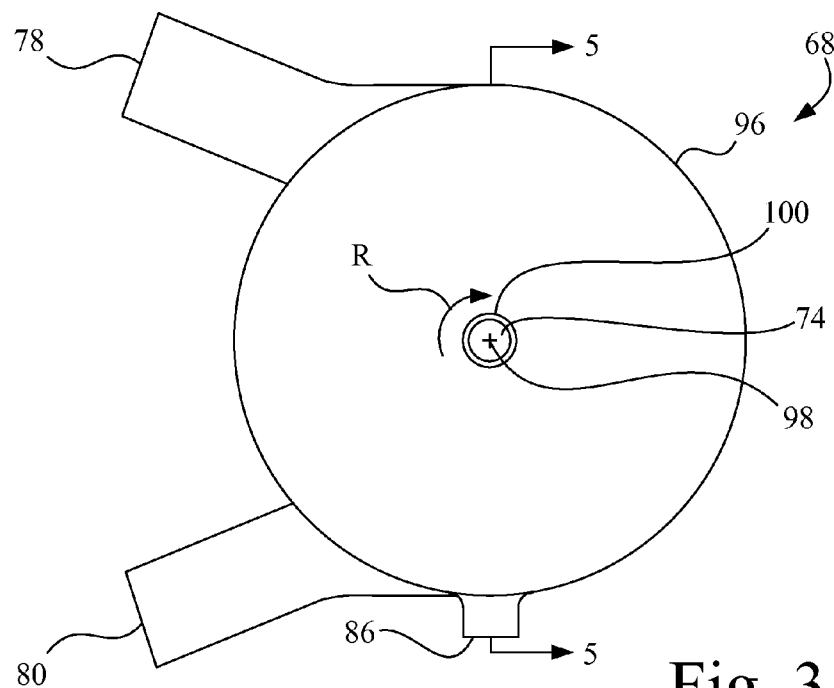
FIG. 3 is a shaft-side end view of the fan unit of FIGS. 1 and 2.

Referring also to the schematic diagram of FIG. 2, agricultural machine 10 includes an internal combustion engine 44 that provides the mechanical power via a rotating crankshaft 44-1, which is needed to perform the propulsion and harvesting operations.

Agricultural machine 10 includes an air cleaner system 46 including an air cleaner 48 and an air pre-cleaner 50 coupled to air cleaner 48. The configuration and operating principles of air cleaner system 46 is typical of that known in the art. Air cleaner system 46 is coupled in fluid communication with internal combustion engine 44 via an air intake system 52 for supplying combustion air to internal combustion engine 44. Air pre-cleaner 50 has a first vacuum port 54.

Agricultural machine 10 includes a cooling package 56 in fluid communication with internal combustion engine 44. Cooling package 56 includes a radiator 58 having an air inlet 58-1 and an air outlet 58-2, a rotary screen 60 mounted at air inlet 58-1 of radiator 58, and a vacuum duct 62 having a vacuum opening 62-1 and a second vacuum port 62-2. Vacuum opening 62-1 of vacuum duct 62 is positioned adjacent rotary screen 60 to assist in removal of dust and chaff from rotary screen 60.

A fan shroud 64 is mounted at air outlet 58-2 of radiator 58. A cooling fan 66 having a plurality of fan blades is rotatably coupled to internal combustion engine 44, and positioned within an opening formed in fan shroud 64 for pulling cooling air through radiator 58 to cool the cooling fluid circulating through radiator 58 and internal combustion engine 44.

In accordance with an embodiment of the present invention, agricultural machine 10 includes a fan unit 68 that is coupled in fluid communication with first vacuum port 54 of air pre-cleaner 50 of air cleaner system 46 via a fluid conduit 70, and is coupled in fluid communication with second vacuum port 62-2 of vacuum duct 62 of cooling package 56 via a fluid conduit 72. Fan unit 68 may include a plurality of fan sections contained in a single multi-section fan housing, and in the present embodiment includes two fan sections identified as fan section 68-1 and fan section 68-2 in FIG. 2. As shown in FIG. 2, a dashed vertical line is used as a visual aid to illustrate a line of demarcation between fan section 68-1 and fan section 68-2. Each of fan section 68-1 and fan section 68-2 is driven by a single common shaft 74 in unison. Shaft 74 may be rotatably coupled to crankshaft 44-1 of internal combustion engine 44 by a belt/pulley system 76.

Fan section 68-1 of fan unit 68 includes air inlet port 78 and an air outlet port 80. Air inlet port 78 is connected to fluid conduit 70. Air outlet port 80 may be connected to an exhaust conduit 82. When fan section 68-1 is driven by the rotation of shaft 74, a negative pressure, i.e., vacuum, is generated at first vacuum port 54 of air pre-cleaner 50, resulting in an air flow from first vacuum port 54 toward fan section 68-1 of fan unit 68, thereby drawing any accumulated dust and debris out of air pre-cleaner 50. In turn, fan section 68-1 of fan unit 68 exhausts the dust and debris removed out of air pre-cleaner 50 to the atmosphere through exhaust conduit 82.

Fan section 68-2 of fan unit 68 includes air inlet port 84 and an air outlet port 86. Air inlet port 84 is connected to fluid conduit 72. Air outlet port 86 may be connected to an exhaust conduit 88. When fan section 68-2 is driven by the rotation of shaft 74, a negative pressure, i.e., vacuum, is generated at vacuum opening 62-1 and second vacuum port 62-2 of vacuum duct 62, resulting in an air flow from vacuum opening 62-1 toward fan section 68-2 of fan unit 68, thereby drawing any accumulated dust and debris off of rotary screen 60 of cooling package 56. In turn, fan section 68-2 of fan unit 68 exhausts the dust and debris removed off of rotary screen 60 to the atmosphere through exhaust conduit 88. Exhaust conduits 82, 88 may then discharge into the same region, or duct, 90 (illustrated by dashed lines) away from air cleaner system 46 and the cooling package rotary screen 60.

Thus, in the exemplary application illustrated in FIGS. 1 and 2, the dedicated fan unit 68 is used to create the negative pressure drop necessary to aspirate air pre-cleaner 50 and clean debris from rotary screen 60. However, those skilled in the art will recognize that the concepts of the present invention may be used in any situation or application where different pressure or flow requirements for different functions are experienced.

In accordance with the present invention, as more fully illustrated in the detailed exemplary embodiments that follow, each fan section of a plurality of fan sections, e.g., fan section 68-1 and fan section 68-2, may have a different number of fan types, fan blades, fan blade types, geometries, or sizes depending on the need for pressure generation or flow generation, and with each fan section being driven in unison by a single shaft 74 common to all of the fan sections. Thus, each fan section, e.g., fan section 68-1 and fan section 68-2, may include a centrifugal type fan or a cross-flow blower type fan, a combination thereof, or identical fan types, driven from the same shaft 74. As used herein, the term "centrifugal type fan" means a fan wherein the air enters the fan section axially, i.e., along the axis of rotation of the fan, and exits the fan section radially with respect to the axis of rotation. Also, as used herein, the term "cross-flow blower type fan" means a fan wherein the air enters the fan section radially with respect to the axis of rotation of the fan, and exits the fan section radially with respect to the axis of rotation of the fan.

Figure 4:
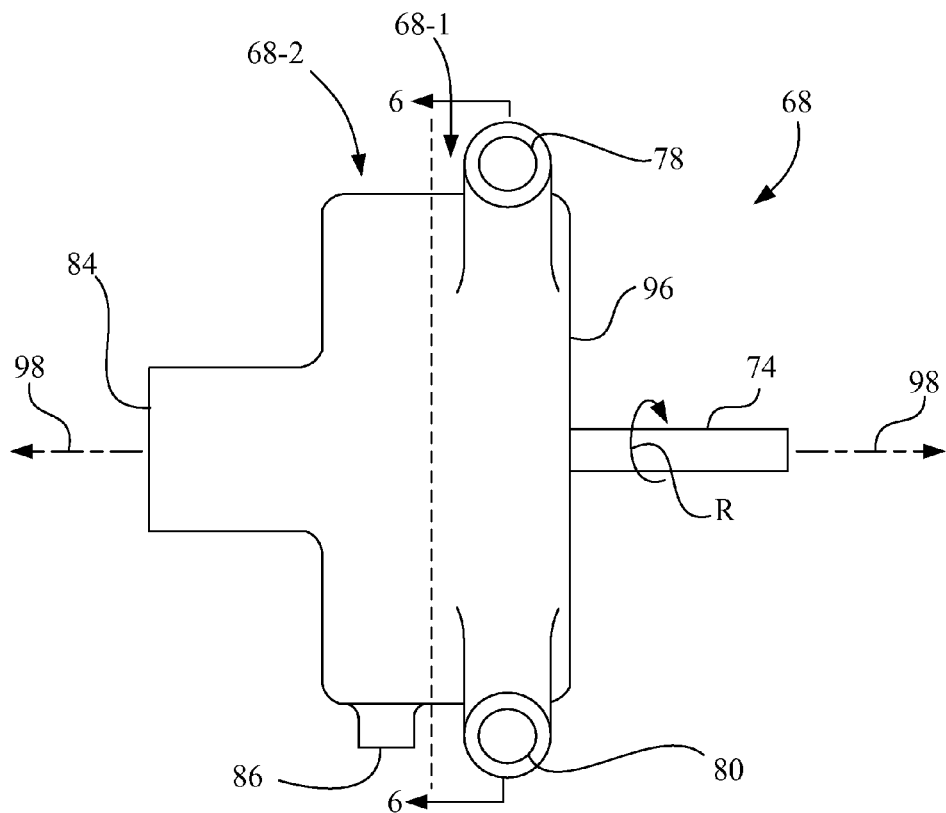
FIG. 4 is a side view of the fan unit of FIG. 3.
Figure 5:
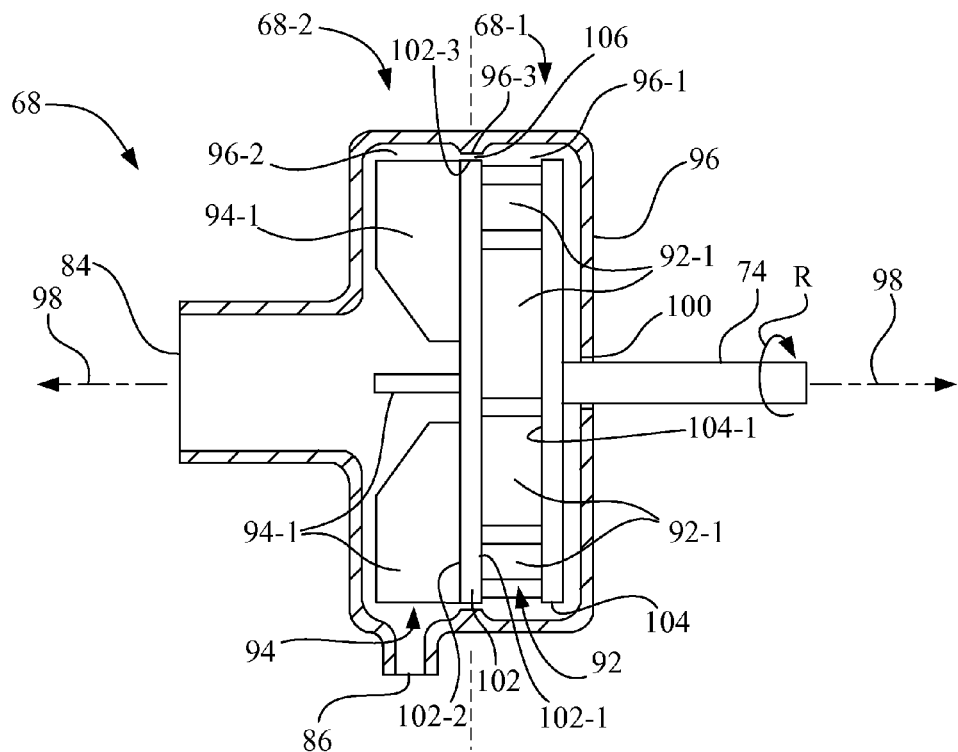
FIG. 5 is a section view of the fan unit of FIG. 3 taken along line 5-5.

FIGS. 3-6 illustrate one embodiment of fan unit 68, wherein fan section 68-1 is configured with a cross-flow blower type fan 92 and fan section 68-2 is configured with a centrifugal type fan 94. As shown in FIGS. 4 and 5, a dashed vertical line is used as a visual aid to illustrate a line of demarcation between fan section 68-1 and fan section 68-2. Cross-flow blower type fan 92 includes a plurality of fan blades 92-1, and centrifugal type fan 94 includes a plurality of fan blades 94-1. Fan unit 68 includes a fan housing 96 configured to define a plurality of fan chambers 96-1, 96-2. Cross-flow blower type fan 92 is located in fan chamber 96-1 and centrifugal type fan 94 is located in the separate respective fan chamber 96-2. An axis of rotation 98 of shaft 74 is oriented to intersect the plurality of fan chambers 96-1 and 96-2.

Each of cross-flow blower type fan 92 and centrifugal type fan 94 is attached to shaft 74 for rotation with shaft 74. Shaft 74 is rotatably mounted to fan housing 96 by a bearing unit 100. Bearing unit 100 may be, for example, one or more roller bearings, needle bearings, bushings, etc., with appropriate seals.

Each fan chamber 96-1, 96-2 has a respective air inlet port and a respective air outlet port. For example, fan chamber 96-1 may include a radially oriented air inlet port 78 and a radially oriented air outlet port 80, with respect the axis of rotation 98 of shaft 74. When shaft 74 is rotated in direction R, air flow is in a direction from air inlet port 78 toward air outlet port 80. Also, fan chamber 96-2 may include an axially oriented air inlet port 84 and a radially oriented air outlet port 86, with respect an axis of rotation 98 of shaft 74. When shaft 74 is rotated in direction R, air flow is in a direction from air inlet port 84 toward air outlet port 86.

Figure 6:
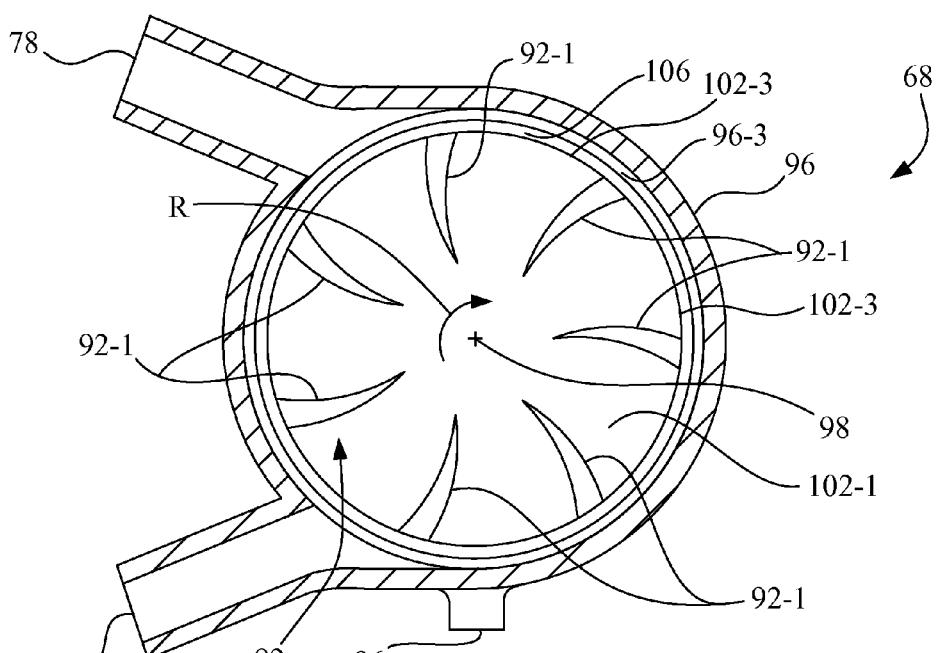
FIG. 6 is a section view of the of the fan unit of FIG. 3 taken along line 6-6 of FIG. 4.

In the embodiment of FIGS. 3-6, as best shown in FIGS. 5 and 6, fan unit 68 includes a separator plate 102 located between fan chamber 96-1 and fan chamber 96-2. Separator plate 102 has a first side 102-1, a second side 102-2 and a radial perimeter 102-3. Fan blades 92-1 extend outwardly from first side 102-1 of separator plate 102 and fan blades 94-1 extend outwardly from second side 102-2 of separator plate 102.

An impeller back plate 104 is directly attached to shaft 74 for rotation therewith, and extends radially from shaft 74. Impeller back plate 104 has a drive side 104-1 connected to fan blades 92-1, with fan blades 92-1 extending from separator plate 102 to impeller back plate 104. In the present embodiment, fan blades 92-1, separator plate 102, and fan blades 94-1 are suspended from impeller back plate 104.

Fan housing 96 includes a radially extending boundary portion 96-3 located between fan chamber 96-1 and fan chamber 96-2. Boundary portion 96-3 extends toward radial perimeter 102-3 of separator plate 102 to define an annular boundary gap 106 between fan housing 96 at boundary portion 96-3 and radial perimeter 102-3 of separator plate 102. The smaller the radial extent of boundary gap 106, the less the amount of air cross-flow between fan chamber 96-1 and fan chamber 96-2.

Figure 7:
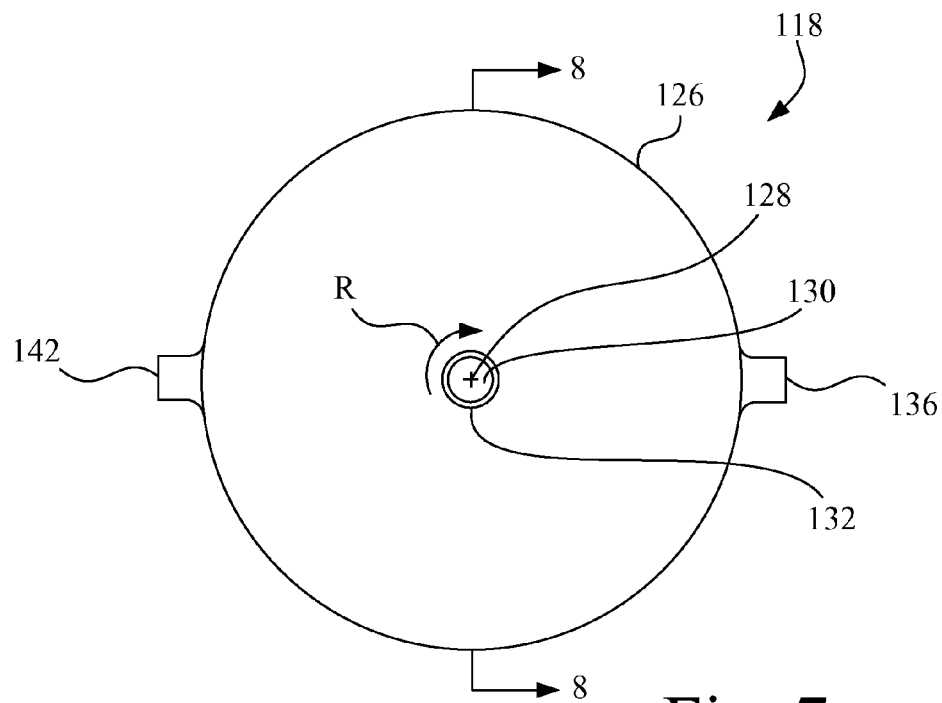
FIG. 7 is a shaft-side end view of another exemplary embodiment of a fan unit suitable for use in the agricultural machine of FIG. 1.
Figure 8:
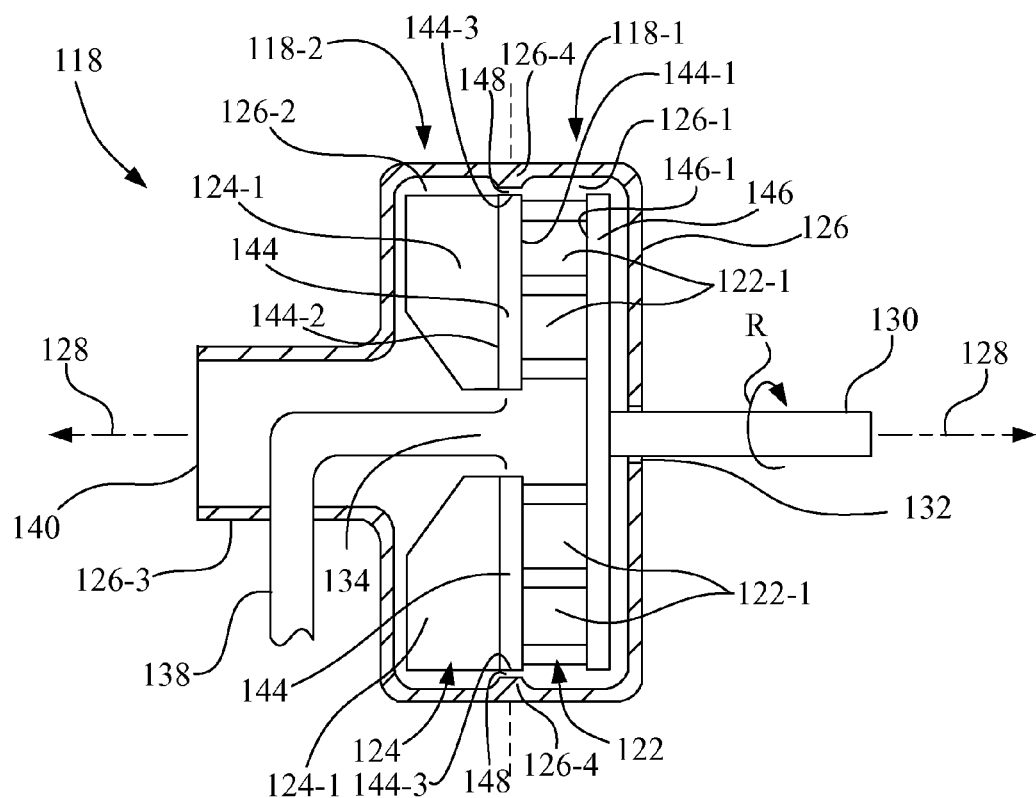
FIG. 8 is a section view of the fan unit of FIG. 7 taken along line 8-8.

FIGS. 7 and 8 illustrate another exemplary embodiment of a fan unit, fan unit 118, which may be substituted for fan unit 68.

Fan unit 118 includes a fan section 118-1 configured with a centrifugal type fan 122 and includes a fan section 118-2 configured with a centrifugal type fan 124. As shown in FIG. 8, a dashed vertical line is used as a visual aid to illustrate a line of demarcation between fan section 118-1 and fan section 118-2. Centrifugal type fan 122 includes a plurality of fan blades 122-1, and centrifugal type fan 124 includes a plurality of fan blades 124-1. Fan unit 118 includes a fan housing 126 configured to define a plurality of fan chambers 126-1, 126-2. Centrifugal type fan 122 is located in fan chamber 126-1 and centrifugal type fan 124 is located in the separate respective fan chamber 126-2. An axis of rotation 128 of a shaft 130 is oriented to intersect the plurality of fan chambers 126-1 and 126-2.

Each of centrifugal type fan 122 and centrifugal type fan 124 is attached to shaft 130 for rotation in unison with shaft 130. Shaft 130 is rotatably mounted to fan housing 126 by a bearing unit 132. Bearing unit 132, may be, for example, one or more roller bearings, needle bearings, bushings, etc., with appropriate seals.

Each fan chamber 126-1, 126-2 has a respective air inlet port and a respective air outlet port. For example, fan chamber 126-1 may include an axially oriented air inlet port 134 and a radially oriented air outlet port 136, with respect the axis of rotation 128 of shaft 130. Axially oriented air inlet port 134 is achieved by a curved conduit 138 that passes through a side wall 126-3 of fan housing 126 and locates air inlet port 134 on rotational axis 128. When shaft 130 is rotated in direction R, air flow is through curved conduit 138 in a direction toward air inlet port 134 and in turn toward air outlet port 136, i.e., from air inlet port 134 toward air outlet port 136.

Also, fan chamber 126-2 may include an axially oriented air inlet port 140 and a radially oriented air outlet port 142, with respect an axis of rotation 128 of shaft 130. When shaft 130 is rotated in direction R, air flow is in a direction from air inlet port 140 toward air outlet port 142.

In the embodiment of FIGS. 7 and 8, as best shown in FIG. 8, fan unit 118 includes a separator plate 144 located between fan chamber 126-1 and fan chamber 126-2. Separator plate 144 has a first side 144-1, a second side 144-2 and a radial perimeter 144-3. Fan blades 122-1 extend outwardly from first side 144-1 of separator plate 144 and fan blades 124-1 extend outwardly from second side 144-2 of separator plate 144.

An impeller back plate 146 is directly attached to shaft 130 for rotation therewith, and extends radially from shaft 130. Impeller back plate 146 has a drive side 146-1 connected to fan blades 122-1, with fan blades 122-1 extending from separator plate 144 to impeller back plate 146. In the present embodiment, fan blades 122-1, separator plate 144, and fan blades 124-1 are suspended from impeller back plate 146.

Fan housing 126 includes a radially extending boundary portion 126-4 located between fan chamber 126-1 and fan chamber 126-2. Boundary portion 126-4 extends toward radial perimeter 144-3 of separator plate 144 to define an annular boundary gap 148 between fan housing 126 at boundary portion 126-4 and radial perimeter 144-3 of separator plate 144. The smaller the radial extent of boundary gap 148, the less the amount of air cross-flow between fan chamber 126-1 and fan chamber 126-2.

Figure 9:
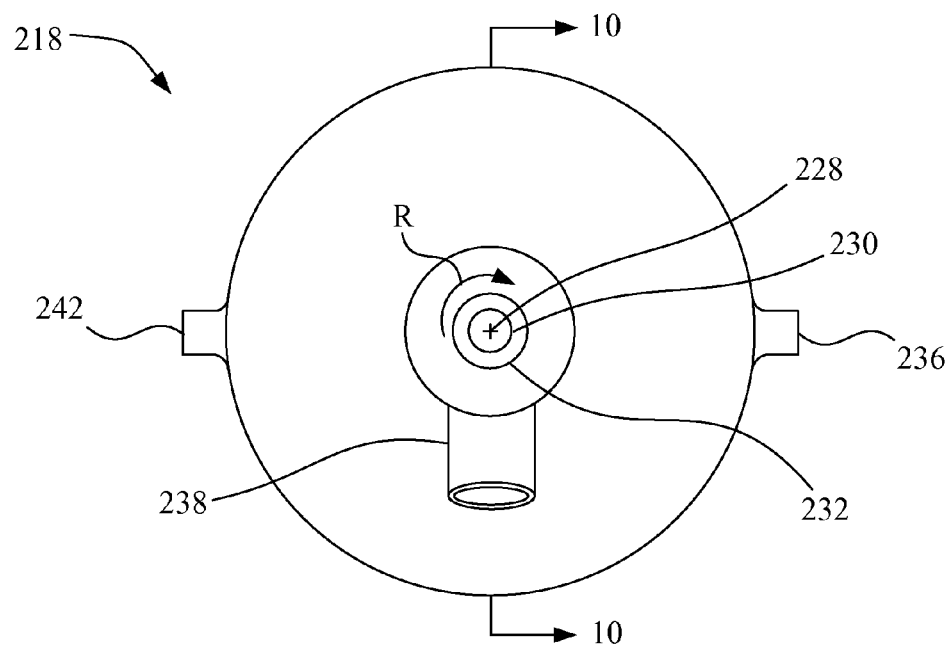
FIG. 9 is a shaft-side end view of another exemplary embodiment of a fan unit suitable for use in the agricultural machine of FIG. 1.
Figure 10:
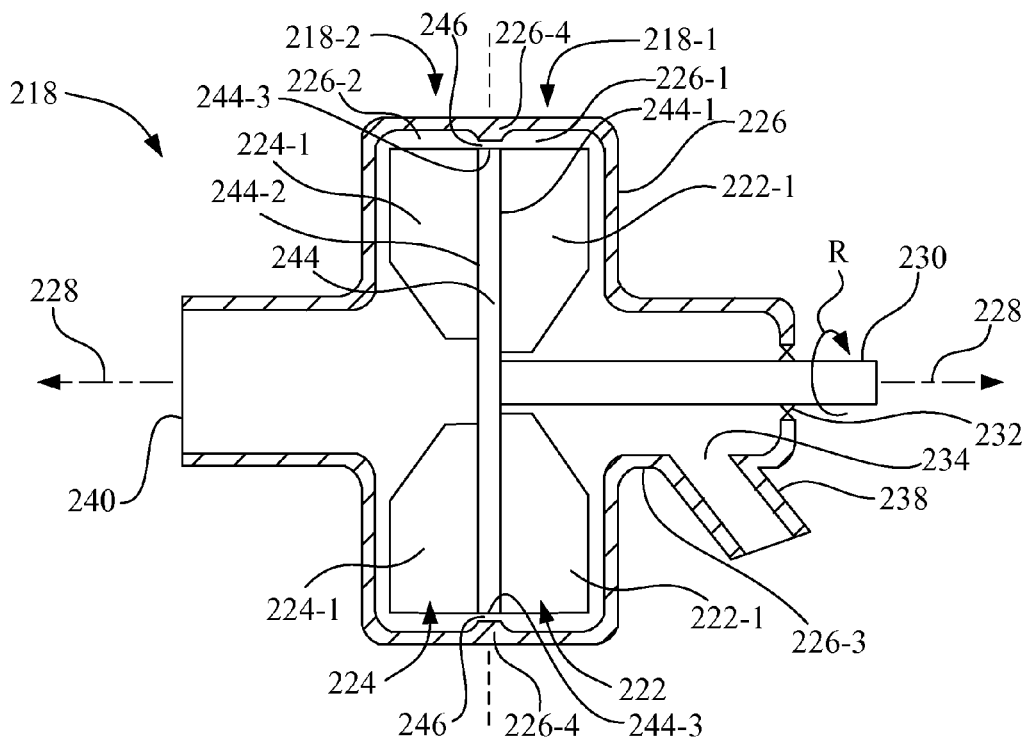
FIG. 10 is a section view of the fan unit of FIG. 9 taken along line 10-10.

FIGS. 9 and 10 illustrate another exemplary embodiment of a fan unit, fan unit 218, which may be substituted for fan unit 68.

Fan unit 218 includes a fan section 218-1 configured with a centrifugal type fan 222 and includes a fan section 218-2 configured with a centrifugal type fan 224. As shown in FIG. 10, a dashed vertical line is used as a visual aid to illustrate a line of demarcation between fan section 218-1 and fan section 218-2. Centrifugal type fan 222 includes a plurality of fan blades 222-1, and centrifugal type fan 224 includes a plurality of fan blades 224-1. Fan unit 218 includes a fan housing 226 configured to define a plurality of fan chambers 226-1, 226-2. Centrifugal type fan 222 is located in fan chamber 226-1 and centrifugal type fan 224 is located in the separate respective fan chamber 226-2. An axis of rotation 228 of a shaft 230 is oriented to intersect the plurality of fan chambers 226-1 and 226-2.

Each of centrifugal type fan 222 and centrifugal type fan 224 is attached to shaft 230 for rotation in unison with shaft 230. Shaft 230 is rotatably mounted to fan housing 226 by a bearing unit 232. Bearing unit 232, may be, for example, one or more roller bearings, needle bearings, bushings, etc., with appropriate seals.

Each fan chamber 226-1, 226-2 has a respective air inlet port and a respective air outlet port. For example, fan chamber 226-1 may include an axially oriented air inlet port 234 and a radially oriented air outlet port 236, with respect the axis of rotation 228 of shaft 230. Axially oriented air inlet port 234 is achieved by a conduit 238 that passes through, or formed integral with, a side wall 226-3 of fan housing 226, and locates air inlet port 234 to face the axis of rotation 228. When shaft 230 is rotated in direction R, air flow is generated through conduit 238 in a direction toward air inlet port 234, and in turn toward air outlet port 236, i.e., from air inlet port 234 toward air outlet port 236.

Also, fan chamber 226-2 may include an axially oriented air inlet port 240 and a radially oriented air outlet port 242, with respect an axis of rotation 228 of shaft 230. When shaft 230 is rotated in direction R, air flow is in a direction from air inlet port 240 toward air outlet port 242.

In the embodiment of FIGS. 9 and 10, as best shown in FIG. 10, fan unit 218 includes an impeller back plate 244 located between fan chamber 226-1 and fan chamber 226-2. Impeller back plate 244 has a first side 244-1, a second side 244-2 and a radial perimeter 244-3. Fan blades 222-1 extend outwardly from first side 244-1 of impeller back plate 244 and fan blades 224-1 extend outwardly from second side 244-2 of impeller back plate 244. Impeller back plate 244 is directly attached to shaft 230 for rotation therewith, and extends radially from shaft 230.

Fan housing 226 includes a radially extending boundary portion 226-4 located between fan chamber 226-1 and fan chamber 226-2. Boundary portion 226-4 extends toward radial perimeter 244-3 of impeller back plate 244 to define an annular boundary gap 246 between fan housing 226 at boundary portion 226-4 and radial perimeter 244-3 of separator plate 244. The smaller the radial extent of boundary gap 246, the less the amount of air cross-flow between fan chamber 226-1 and fan chamber 226-2.

In view of the embodiments described above, those skilled in the art will recognize that the number of fan sections in the fan unit may be two or more. Also, the multiple fan sections forming the fan unit may be identical, or may have different structures, e.g., in terms of fan types, number of blades, blade types, geometries, or sizes, depending on the desired pressure generation or flow generation for a respective fan section.

Having described the preferred embodiment, it will become apparent that various modifications can be made without departing from the scope of the invention as defined in the accompanying claims.

The invention claimed is:

1. An agricultural machine, comprising:
   an internal combustion engine having a crankshaft;
   an air cleaner system including an air cleaner and an air pre-cleaner coupled to said air cleaner, said air cleaner system being coupled in fluid communication with said internal combustion engine for supplying combustion air to said internal combustion engine, said air pre-cleaner having a first vacuum port;
   a cooling package in fluid communication with said internal combustion engine, said cooling package including a radiator having an air inlet and an air outlet, a rotary screen mounted at said air inlet of said radiator, and a vacuum duct having a vacuum opening and a second vacuum port, said vacuum opening of said vacuum duct being positioned adjacent said rotary screen; and
   a fan unit coupled in fluid communication with said air pre-cleaner and said cooling package, said fan unit including:
      a fan housing configured to define a plurality of fan chambers, each fan chamber of said plurality of fan chambers having a respective air inlet port and a respective air outlet port, wherein a first air inlet port of a first fan chamber of said plurality of fan chambers is connected in fluid communication with said first vacuum port of said air pre-cleaner, and wherein a second air inlet port of a second fan chamber of said plurality of fan chambers is connected in fluid communication with said second vacuum port of said cooling package;
      a shaft rotatably mounted to said fan housing, said shaft being rotatably coupled to said crankshaft of said internal combustion engine; and
      a plurality of fans attached to said shaft for rotation with said shaft, wherein a first fan of said plurality of fans is located in said first fan chamber and a second fan of said plurality of fans is located in said second fan chamber.

2. The agricultural machine of claim 1, wherein at least one of said first fan and said second fan is a centrifugal type fan.

3. The agricultural machine of claim 1, wherein at least one of said first fan and said second fan is a cross-flow blower type fan.

* * * * *